(12) United States Patent
Yoneda

(10) Patent No.: US 6,876,808 B2
(45) Date of Patent: Apr. 5, 2005

(54) OPTICAL WAVEGUIDE DEVICE

(75) Inventor: Shigeru Yoneda, Tokyo (JP)

(73) Assignee: NEC Corporation, Tokyo (JP)

( * ) Notice: Subject to any disclaimer, the term of this patent is extended or adjusted under 35 U.S.C. 154(b) by 154 days.

(21) Appl. No.: 10/206,054

(22) Filed: Jul. 29, 2002

(65) Prior Publication Data

US 2003/0021567 A1 Jan. 30, 2003

(30) Foreign Application Priority Data

Jul. 27, 2001 (JP) ........................................ 2001-227517

(51) Int. Cl.$^7$ ............................................... G02B 6/10
(52) U.S. Cl. .......................... 385/129; 385/14; 385/131
(58) Field of Search ............................ 385/129, 24, 39, 385/131, 141, 14

(56) References Cited

U.S. PATENT DOCUMENTS

| | | | | |
|---|---|---|---|---|
| 5,621,839 A | * | 4/1997 | Asano et al. ................ | 385/129 |
| 5,949,943 A | * | 9/1999 | Watanabe et al. ........... | 385/129 |
| 5,978,539 A | * | 11/1999 | Davies et al. ................ | 385/129 |
| 6,067,392 A | * | 5/2000 | Wakami et al. ................ | 385/37 |
| 6,360,047 B1 | * | 3/2002 | Nekado et al. .............. | 385/129 |
| 6,377,723 B1 | * | 4/2002 | Saito et al. .................... | 385/15 |
| 6,377,743 B1 | * | 4/2002 | Ueda et al. .................... | 385/137 |
| 6,477,308 B2 | * | 11/2002 | Hattori et al. ............... | 385/129 |
| 6,603,916 B1 | * | 8/2003 | McGreer et al. ............. | 385/129 |
| 6,671,433 B2 | * | 12/2003 | Kashihara et al. ............ | 385/37 |
| 6,684,019 B1 | * | 1/2004 | Norwood et al. ........... | 385/129 |
| 6,760,521 B2 | * | 7/2004 | Watanabe ..................... | 385/50 |

FOREIGN PATENT DOCUMENTS

| | | |
|---|---|---|
| JP | A 10-39150 | 2/1998 |
| JP | A 11-109155 | 4/1999 |
| JP | A 11-174251 | 7/1999 |
| JP | A 2000-206348 | 7/2000 |
| JP | A 2000-292632 | 10/2000 |
| JP | A 2000-352633 | 12/2000 |

OTHER PUBLICATIONS

N. Ooba et al. "Athermal Silica–Based Arrayed–Waveguide Grating Multiplexer Using Bimetal Plate Temperature Compensator," Electronics Letters, V. 36, 2000, pp. 1800–1801.
Yoshiaki Ishigami et al., "Temperature Compensation for Add/Drop Filter on PLC," IEICE Electronics Society Conference 2000, C–3–13, 2000, p. 138.

* cited by examiner

*Primary Examiner*—Karl D. Frech
*Assistant Examiner*—Edwyn Labaze
(74) *Attorney, Agent, or Firm*—Young & Thompson

(57) ABSTRACT

To obtain an optical waveguide device suppressed in fluctuations of characteristics of optical waveguide element due to temperature changes. An arrayed waveguide grating as an optical waveguide device comprises a flat waveguide element of specified thickness $h_0$ forming an optical waveguide layer on a silicon substrate, a first correction substrate of thickness h1 adhered to the optical waveguide layer side, and a second correction substrate of thickness $h_4$ adhered to the silicon substrate side. By properly setting the coefficients of linear expansion $\alpha_1$, $\alpha_4$ and Young's moduls $E_1$, $E_4$ of the two correction substrates, and using first and second adhesives of high rigidity, warp and expansion and contraction of the waveguide element due to temperature changes can be suppressed to minimum limit. Therefore, the optical waveguide device does not require temperature adjustment.

4 Claims, 9 Drawing Sheets

(Temperature rise)

OPTICAL WAVEGUIDE DEVICE

FIELD OF THE INVENTION

The present invention relates to a optical waveguide device as a filter device used in optical communications or information processing field using light, and more particularly to a optical waveguide device decreased in the temperature dependence or decreased to a level which can be ignored.

BACKGROUND OF THE INVENTION

Along with the spread of optical communication technology and development of information processing technology using light, the optical waveguide devices come to be used widely as filter device. In this kind of optical waveguide device realizing various functions by making use of interference of light, generally, since the refractive index and optical path length vary depending on the ambient temperature, it is characterized by fluctuation of the passing band or central wavelength.

Such dependence of central wavelength on temperature in the optical waveguide is generally expressed in formula (1).

$$\frac{d\lambda_0}{dT} = \frac{\lambda_0}{n_{eq}} \left( \frac{1}{L} \frac{dS}{dT} \right) \quad (1)$$

where $\lambda_0$ is the central wavelength, $n_{eq}$ is the equivalent refractive index of optical waveguide, and $1/L*dsss/dT$ is the temperature coefficient of optical path length. The temperature coefficient of optical path length can be expressed in formula (2).

$$\frac{1}{L} \frac{dS}{dT} = \frac{dn_{eq}}{dT} + n_{eq}\alpha \quad (2)$$

where $\alpha$ is the thermal expansion coefficient of the optical waveguide. The thermal expansion coefficient $\alpha$ can be generally approximated by the thermal expansion coefficient of the substrate material. From these formulas (1) and (2), it is known possible to change the temperature dependence of the center wavelength of the optical waveguide device by adjusting the thermal expansion coefficient of the substrate.

That the optical waveguide device has a temperature dependence means that some means is necessary for keeping its characteristic constant regardless of changes of ambient temperature. As such means, for example, it has been attempted to incorporate a Peltier element or heater in the module. But it requires an extra element or part to be incorporated, and not only the cost of the optical waveguide device or the module using it is increased, but also it is contradictory to reduction of size or weight. Accordingly, it has been studied to develop a new technique for realizing temperature independence, that is, rendering the optical waveguide device athermal.

Techniques for lessening the temperature dependence are disclosed, for example, in Japanese Patent Application Laid-open No. 11-174231, Japanese Patent Application Laid-open No. 2000-206348, IEICE Electronics Society Conference 2000, C-3-13, and Electronics Letters $12^{th}$ October 2000, Vol. 36, No. 21.

FIG. 1 and FIG. 2 show an optical waveguide element substrate, and specifically FIG. 1 shows its plane structure, and FIG. 2 shows a section of the substrate cut in the longitudinal direction in FIG. 1. The optical waveguide element substrate 101 of this example composes a Mach-Zehnder interferometer, which comprises waveguides 103, 104 connected to an input port $102_1$ and an output port $102_2$, first and second couplers 105, 106 connected to these waveguides 103, 104, and first and second gratings 107, 108 disposed parallel between these couplers 105, 106.

In this optical waveguide element substrate 101, as shown in FIG. 2, a material of a large thermal expansion coefficient such as aluminum plate 111 is adhered to the reverse side. Due to difference in the thermal expansion coefficient from the aluminum plate 111, a thermal distortion is generated in the optical waveguide element substrate 101. By this thermal distortion, the optical waveguide layer is warped as shown in FIG. 2, and hence the linear expansion coefficient is suppressed to the negative side, so that the temperature dependence of the optical waveguide element substrate 101 is lowered.

By this technique, however, when the light guiding direction and warping direction are deviated, polarization dependence occurs. Accordingly, the optical waveguide element substrate to which this technique can be applied is limited to the optical waveguide element of which light guiding direction is almost one-dimensional or one direction as shown in FIG. 1. In other words, it cannot be applied to the optical waveguide element of which light guiding direction is two-dimensional or X and Y directions. This is explained in the following.

FIG. 3 shows an optical waveguide element substrate of which light guiding direction is two-dimensional, presenting an example of AWG (arrayed waveguide grating). The optical waveguide element substrate 121 of this example comprises a first waveguide 124 or a second waveguide 125 connected to a first port 122 or a second port 123, a first or second slab waveguide 126 or 127 having one end connected to the first optical waveguide 124 or second optical waveguide 125, and a plurality of channel waveguide arrays 128 mutually connecting the other ends of the slab waveguides 126, 127. The optical waveguide element for composing this optical waveguide element substrate 121 has a light multiplexing and demultiplexing function, and has a central wavelength of minimum loss as optical filter characteristic.

FIG. 4 shows a bimetal structure formed by adhering plates of different coefficients of thermal expansion to the optical waveguide element substrate 121 shown in FIG. 3. The optical waveguide element substrate 121 is composed of a silicon substrate 121A, and a waveguide layer 121B formed on its surface, and a plate material 129 of a different thermal expansion coefficient is adhered to the lower side of the silicon substrate 121A in order to compose a bimetal structure.

FIG. 5 compares the central wavelength characteristics as the optical filter characteristics in relation to the substrate temperature in the optical waveguide element substrate shown in FIG. 3, having a plate material for composing a bimetal structure adhered and not adhered to the substrate. This example is disclosed, for instance, in Electronics Letters 12th October 2000, Vol. 36, No. 21. In the diagram, two characteristic lines 131, 132 refer to a case of the substrate to which a plate material is not adhered to compose a bimetal structure, and specifically the characteristic line 131 consisting of black squares showing measuring points shows a case of TM polarization, and the characteristic line 132 of blank squares indicates a case of TE polarization. Other two characteristic lines 133, 134 refer to the bimetal structures, and the characteristic line 133 of black circles shows a case of TM polarization and the characteristic line 134 of white circles indicates a case of TE polarization.

As known from FIG. 5, the bimetal structure is smaller in dislocation of the central wavelength with respect to temperature, and shows better results than the non-bimetal structure. In these two characteristic lines 133, 134, however, the difference of dislocation of central wavelength when the temperature is low and the difference of dislocation of central wavelength when the temperature is high are not equal to each other, and a fluctuation occurs in these differences due to temperature. Therefore, not only the polarization dependence is increased, but also the temperature dependence is increased.

FIG. 6 and FIG. 7 show measures for solving such problem. In the proposal presented at Signal Society General Meeting 2000, C-3-13, an aluminum plate 142 is adhered to a waveguide substrate 141 shown in FIG. 6, and it is processed as shown in FIG. 7. Namely, a region 141A of a specified width including a waveguide 143 is formed in a convex shape thicker than the other region 141B, and the aluminum plate 142 is removed at the position corresponding to the waveguide 143.

Thus, in this proposal, by forming the structure as shown in FIG. 7, it is attempted to cancel the distortion occurring vertically in the waveguide direction. Although such technique is effective in the waveguide device having the guiding direction limited in one direction, it is difficult to apply in the optical waveguide element of which guiding direction is two-dimensional such as the optical waveguide element substrate 121 shown in FIG. 3.

FIG. 8 shows a proposal of adhesion of a substrate having a negative linear expansion coefficient to the upper surface of the optical waveguide element. As disclosed in Japanese Laid-open Patent No. 10-39150, Japanese Patent Application Laid-open No. 2000-292632, Japanese Patent Application Laid-open No. 11-109155, and Japanese Patent Application Laid-open No. 2000-352633, as shown in FIG. 8, a substrate 151 having a negative linear expansion coefficient is adhered to an AWG 152, and the entire linear expansion coefficient is suppressed to the negative side. The arrayed waveguide grating in the diagram is composed same as shown in FIG. 3, that is, multiplex lights of wavelengths $\lambda_1$, $\lambda_2$, ..., $\lambda_N$ are entered from the first port 122 side, and optical signals separated into wavelengths $\lambda_1, \lambda_2, ..., \lambda_N$ are taken out from the second port 123 side.

On the other hand, FIG. 9 shows other example of adhesion of a substrate having a negative linear expansion coefficient to the optical waveguide element. In this example, at both sides of an optical waveguide layer 162 having an optical waveguide pattern 161 and an optical waveguide substrate 163 disposed at its lower side, materials of negative linear expansion coefficient composed of substrates 164, 165 having mutually different coefficients of linear expansion are adhered. Such technique is disclosed, for example, in Japanese Patent Application Laid-open No. 11-1099155, and same effects as in the proposal in FIG. 8 are obtained.

Japanese Patent Application Laid-open No. 2000-292632 also proposes a Mach-Zehnder interferometer same as shown in FIG. 9. In the proposal disclosed in Japanese Patent Application Laid-open No. 2000-292632, however, a first carbon sheet having a negative linear expansion coefficient in a fibrous texture direction without covering the 3 dB coupler is adhered to the waveguide surface for composing the optical waveguide layer 162, and a second sheet of a similar structure is adhered to the optical waveguide substrate 163 at the reverse side. Using the first and second carbon sheets (corresponding to the substrates 164, 165 having mutually different coefficients of linear expansion in FIG. 9), by weaving and forming a textile sheet, the ratio of the overall thickness of the substrate having negative coefficients of linear expansion is increased with respect to the thickness of the optical waveguide layer 162, and the suppressing effect of wavelength changes due to temperature is enhanced.

However, in the technologies disclosed in Japanese Patent Application Laid-open No. 10-39150, Japanese Patent Application Laid-open No. 2000-292632, and Japanese Patent Application Laid-open No. 11-109155, from the viewpoint of suppressing expansion or contraction of the waveguide element due to temperature as much as possible, a material having a negative linear expansion coefficient is adhered to both sides of the optical waveguide element. Only by adhering the material having a negative linear expansion coefficient to both sides of the optical waveguide element, the optical waveguide element is warped due to difference in the linear expansion coefficient, in addition to the warp caused by expansion or contraction due to temperature.

Namely, to eliminate the temperature dependence of the optical characteristics of the optical waveguide element, and suppress the thermal deformation of the waveguide element in the longitudinal direction, hitherto, it has been attempted to adhere a correction plate having a smaller linear expansion coefficient than the waveguide element. In such technique, however, bending stress is generated by the difference in the linear expansion coefficient, and thermal deformation in warping direction occurs, and other optical characteristics of the waveguide element deteriorate.

It is hence an object of the invention to present a optical waveguide device capable of suppressing fluctuations of the characteristics of the optical waveguide element possibly occurring due to temperature changes, thereby not requiring temperature adjusting means.

SUMMARY OF THE INVENTION

The invention is a optical waveguide device which comprises (a) a flat waveguide element having a specified thickness with a waveguide layer formed on a substrate, and (b) a correction substrate made of a plurality of flat materials affixed to both sides or one side of the waveguide element, for decreasing the length and warping force of the waveguide element due to temperature changes as compared with the case of the waveguide element alone.

Namely, plural flat correction substrates are affixed to both sides or one side of the flat waveguide element, and all of them including the waveguide element are set to such values that their length and warping force due to temperature changes may be decreased as compared with the case of the waveguide element alone. For example, when one correction substrate is affixed to one side of the waveguide element, warping may occur on the whole due to difference in the linear expansion coefficient of the waveguide element, but this warping can be decreased by affixing further one or a plurality of correction substrates to this correction substrate and setting the coefficients of linear expansion of these correction substrates at proper values. Moreover, by correcting in the direction of suppressing the expansion or contraction due to temperature of the waveguide element by these correction substrates, fluctuations of characteristics of the waveguide element can be suppressed if temperature changes occur, so that temperature adjustment of waveguide element may not be required.

The invention also is a optical waveguide device which comprises (a) a flat waveguide element having a specified thickness with a waveguide layer formed on a substrate, and (b) first and second correction substrates made of two flat materials affixed to both sides of the waveguide element, having their coefficients of linear expansion set at such values as to decrease the length and warping force of the waveguide element due to temperature changes as compared with the case of the waveguide element alone.

Namely, first and second correction substrates are affixed so as to enclose at both sides of the flat waveguide element, and the coefficients of linear expansion of the first and second correction substrates are set to such values that the length and warping force of the waveguide element due to temperature changes may be decreased as compared with the case of the waveguide element alone. For example, when the first correction substrate is affixed to one side of the waveguide element, warping may occur on the whole due to difference in the linear expansion coefficient of the waveguide element, but this warping can be decreased by affixing the second correction substrate to the opposite side and setting its linear expansion coefficient to a proper value. Moreover, by correcting in the direction of suppressing the expansion or contraction due to temperature of the waveguide element by the first and second correction substrates, fluctuations of characteristics of the waveguide element can be suppressed if temperature changes occur, so that temperature adjustment of waveguide element may not be required.

The invention also is a optical waveguide device which comprises (a) a flat waveguide element having a specified thickness with a waveguide layer formed on a substrate, and (b) first and second correction substrates made of two flat materials affixed to both sides of the waveguide element, having their coefficients of linear expansion, or moduli of longitudinal elasticity (hereinafter called Young's moduli), or thicknesses, or plural items thereof set at such values as to decrease the length and warping force of the waveguide element due to temperature changes as compared with the case of the waveguide element alone.

Namely, first and second correction substrates are affixed so as to enclose at both sides of the flat waveguide element, and the coefficients of linear expansion of the first and second correction substrates, or Young's moduli, or thicknesses, or plural items thereof set at such values as to decrease the length and warping force of the waveguide element due to temperature changes as compared with the case of the waveguide element alone. For example, when the first correction substrate is affixed to one side of the waveguide element, warping may occur on the whole due to difference in the linear expansion coefficient of the waveguide element, but this warping can be decreased by adhering the second correction substrate to the opposite side and setting its linear expansion coefficient to a proper value. Or the warping may be decreased by disposing one correction substrate at the waveguide layer side of the waveguide element, and setting the thickness greater than the thickness of the waveguide element, and setting the linear expansion coefficient larger than the linear expansion coefficient of the waveguide element, or by setting the Young's modulus, thickness or plural items thereof at proper values. Moreover, by correcting in the direction of suppressing the expansion or contraction due to temperature of the waveguide element by the first and second correction substrates, fluctuations of characteristics of the waveguide element can be suppressed if temperature changes occur, so that temperature adjustment of waveguide element may not be required.

The invention also is a optical waveguide device which comprises (a) a flat waveguide element having a specified thickness with a waveguide layer formed on a substrate, (b) a first correction substrate disposed at the waveguide layer side of this waveguide element, having a thickness greater than the thickness of the waveguide element and a linear expansion coefficient smaller than the linear expansion coefficient of the waveguide element, and (c) a second correction substrate disposed at the substrate side of the waveguide element, thicker than the first correction substrate, and having a linear expansion coefficient smaller than the linear expansion coefficient of the waveguide element, and a linear expansion coefficient smaller than the linear expansion coefficient of the first correction substrate.

Namely, first and second correction substrates are affixed so as to enclose at both sides of the flat waveguide element. Herein, the second correction substrate is disposed at the substrate side of the waveguide element, and is thicker than the first correction substrate, and has a linear expansion coefficient smaller than the linear expansion coefficient of the waveguide element, and a linear expansion coefficient smaller than the linear expansion coefficient of the first correction substrate. Since the first and second correction substrates have a thickness greater than the thickness of the waveguide element and a linear expansion coefficient smaller than the linear expansion coefficient of the waveguide element, expansion or contraction of the waveguide element due to temperature changes can be suppressed. Moreover, since these correction substrates are enclosing the both sides of the waveguide element, by properly setting their coefficients of linear expansion or thickness, generation of warp of waveguide element can be suppressed to a minimum limit. In the invention of claim 4, still more, since the first and second correction substrates differ in the linear expansion coefficient and the first correction substrate has a greater negative value, the first correction substrate disposed at the waveguide layer side of the waveguide element can be formed relatively in a smaller thickness. In addition, by the first and second correction substrates, expansion and contraction of the waveguide element due to temperature can be corrected in a suppressing direction, and fluctuations of characteristics of the waveguide element can be suppressed if temperature changes occur, so that temperature adjustment of waveguide element may not be required.

The invention also is a optical waveguide device which comprises (a) a flat waveguide element having a specified thickness with a waveguide layer formed on a substrate, (b) a first correction substrate disposed at the waveguide layer side of this waveguide element, having a thickness greater than the thickness of the waveguide element and a negative linear expansion coefficient, and (c) a second correction substrate disposed at the substrate side of the waveguide element, thicker than the first correction substrate, and having a negative linear expansion coefficient, and a linear expansion coefficient of greater absolute value than the linear expansion coefficient of the first correction substrate.

Namely, first and second correction substrates are affixed so as to enclose at both sides of the flat waveguide element. Herein, the first correction substrate is disposed at the substrate side of the waveguide element, and is thicker than the waveguide element, and has a negative linear expansion coefficient. The second correction substrate is disposed at the substrate side of the waveguide element, and is thicker than the first correction substrate, and has a negative linear expansion coefficient, and more specifically has a linear expansion coefficient of a greater absolute value than the linear expansion coefficient of the first correction substrate. Since the first and second correction substrates have a thickness greater than the thickness of the waveguide element and a negative linear expansion coefficient, expansion or contraction of the waveguide element due to temperature changes can be suppressed. Moreover, since these correction substrates are enclosing the both sides of the waveguide element, by properly setting their coefficients of linear expansion or thickness, generation of warp of waveguide element can be suppressed to a minimum limit. In the invention of claim 5, still more, since the second correction substrate has a linear expansion coefficient of a larger absolute value than the linear expansion coefficient of the first correction substrate, the first correction substrate disposed at the waveguide layer side of the waveguide element can be formed relatively in a smaller thickness. In addition, by the first and second correction substrates, expansion and contraction of the waveguide element due to temperature can be corrected in a suppressing direction, and fluctuations of characteristics of the waveguide element can be suppressed if temperature changes occur, so that temperature adjustment of waveguide element may not be required.

The invention also relates to the optical waveguide device of in which one of the first and second correction substrates is a plate for holding the waveguide element.

Namely, one of the first and second correction substrates can be shared by the holding plate of the waveguide element.

The invention also relates to the optical waveguide device in which the first and second correction substrates are mutually equal in the linear expansion coefficient and modulus of longitudinal elasticity, and also mutually equal in the thickness.

Namely, as far as the waveguide layer itself is not basically warped in spite of temperature changes, the first and second correction substrates as the correction substrates disposed at both sides may be composed identically. In this case, by setting their coefficients of linear expansion and Young's moduli at the values for correcting the expansion or contraction of the waveguide element due to temperature changes, the waveguide element is made independent of temperature.

The invention also relates to the optical waveguide device in which the waveguide element and the correction substrate are affixed to each other with an adhesive of high rigidity.

Namely, when the waveguide element and correction substrate are affixed with an adhesive of high rigidity, expansion or contraction of correction substrate due to temperature can be efficiently transmitted to the waveguide element, and the degree of expansion or contraction of waveguide element can be decreased.

The invention also relates to the optical waveguide device of which further comprises (a) a fiber array for coupling optically with the waveguide element, and (b) a clamp glass disposed at the upper side of the waveguide element for reinforcing the adhesive strength of the fiber array.

Namely, the optical waveguide device is such a type as to dispose a clamp glass for adhering and reinforcing the fiber array.

The invention also relates to the optical waveguide device in which the thickness of the first correction substrate is equal to or smaller than that of the clamp glass.

Namely, attention is paid to the thickness of the entire device when the first correction substrate is disposed at the waveguide layer side of the waveguide element. The first correction substrate is as thin as the clamp glass or less, and the thickness of the entire device is not particularly increased.

The invention also relates to the optical waveguide device in which at least one of the confronting surfaces of the waveguide element and correction substrate is a coarse surface.

Namely, since at least a part of the confronting sides of the waveguide element and correction substrate is a coarse surface, expansion or contraction of correction substrate due to temperature can be efficiently transmitted to the waveguide element, and the degree of expansion or contraction of waveguide element can be decreased.

The invention also relates to the optical waveguide device in which the layout pattern of the coarse surface of the confronting surface is set depending on the two-dimensional pattern of the waveguide element.

Namely, imbalance of expansion and contraction by temperature with respect to the two-dimensional configuration of the optical waveguide device is eliminated or decreased by controlling the layout pattern of the coarse surface. Herein, the layout pattern of the coarse surface is not the mere pattern of the region in which the coarse surface is disposed, but includes selective use of plural coarse surface patterns showing which coarse surface is disposed in which region, or an analog pattern layout showing the region of continuous variation of degree of coarseness of the coarse surface.

The invention also is a optical waveguide device which comprises (a) a flat waveguide element composed of a substrate layer and a waveguide layer, (b) a first correction substrate affixed to the upper side of the waveguide element, having a negative linear expansion coefficient, and (c) a second correction substrate affixed to the lower side of the waveguide element, having a negative linear expansion coefficient.

Namely, since the first or second correction substrate having a negative thermal expansion coefficient is affixed to the upper side and lower side of the flat waveguide element, expansion or contraction of the waveguide element due to temperature changes can be suppressed. Moreover, since these correction substrates enclose the both sides of the flat waveguide element, by setting their coefficients of linear expansion or thickness properly, warp of the waveguide element can be kept to a minimum limit.

The invention also relates to the optical waveguide device in which the absolute value of the linear expansion coefficient of the first correction substrate is smaller than that of the linear expansion coefficient of the second correction substrate.

Namely, the first and second correction substrates are different in the linear expansion coefficient, and the absolute value of the linear expansion coefficient of the first correction substrate is smaller than that of the linear expansion coefficient of the second correction substrate, warp of the waveguide element can be suppressed more efficiently.

The invention also relates to the optical waveguide device in which the waveguide element and the first and second correction substrates are affixed with an adhesive of high rigidity.

Namely, being affixed with an adhesive of high rigidity, expansion or contraction of correction substrate due to temperature can be efficiently transmitted to the waveguide element, and the degree of expansion or contraction of waveguide element can be decreased.

DESCRIPTION OF THE PREFERRED EMBODIMENTS

The principle of the configuration of the invention is explained below.

Figure 1:
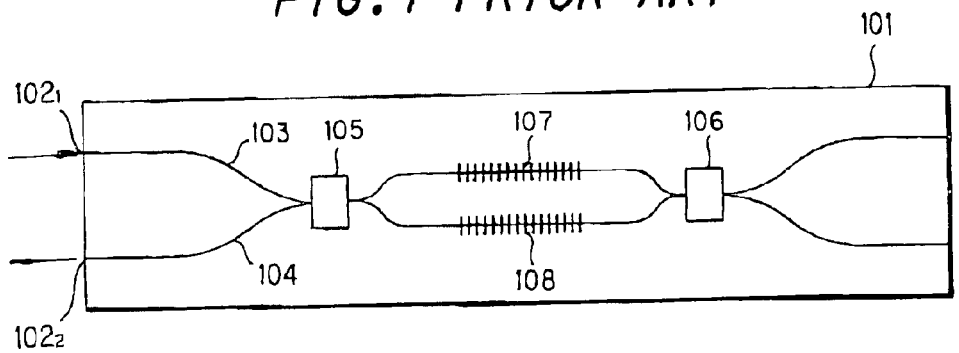
FIG. 1 is a one-dimensional plan view of a conventionally proposed optical waveguide element substrate.
Figure 2:
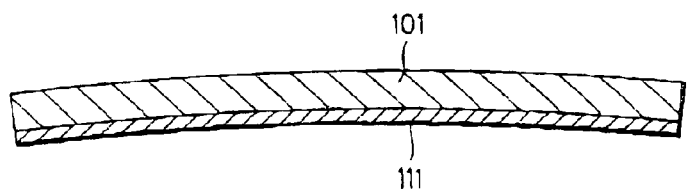
FIG. 2 is a sectional view cutting off the optical waveguide element substrate shown in FIG. 1 in the longitudinal direction.
Figure 3:
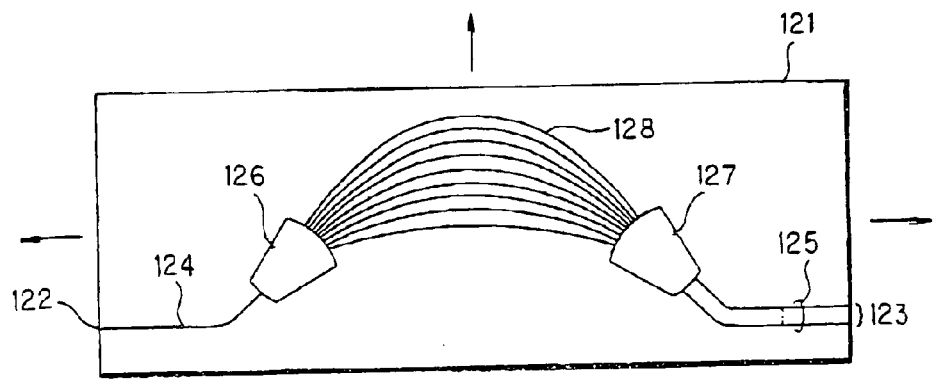
FIG. 3 is a two-dimensional plan view of a conventionally proposed optical waveguide element substrate.
Figure 4:
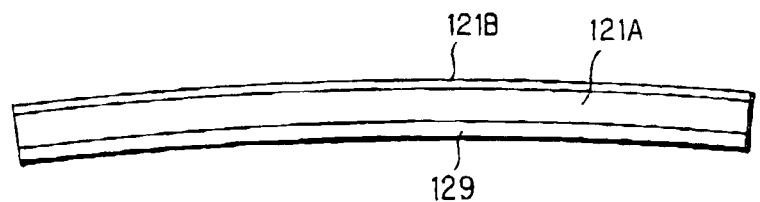
FIG. 4 is a side view of the optical waveguide element substrate shown in FIG. 3.
Figure 5:
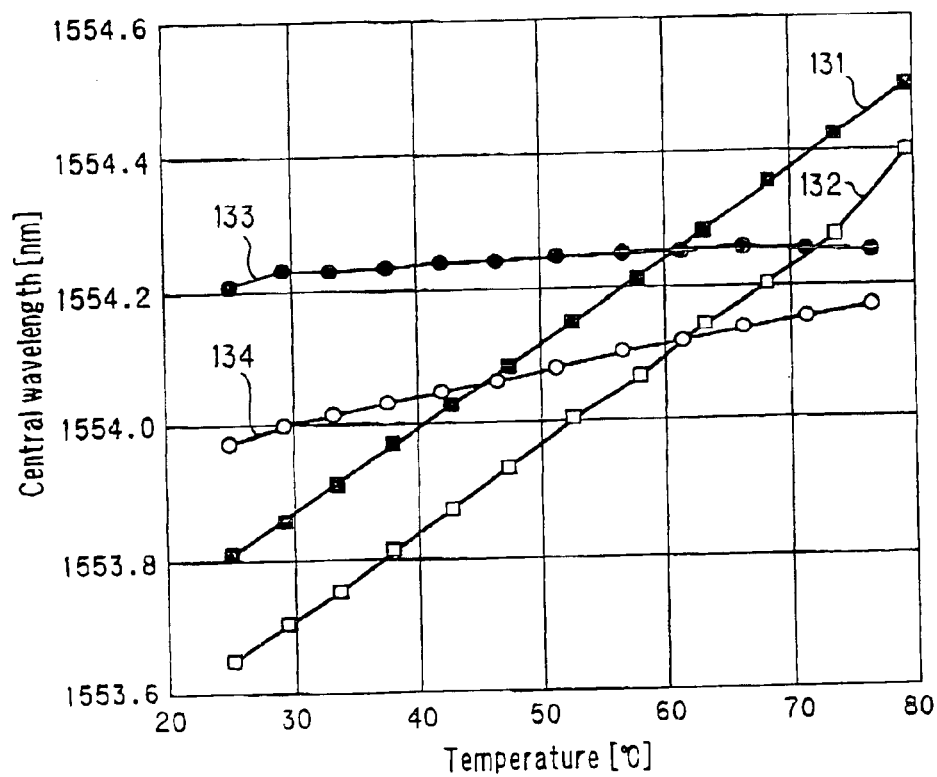
FIG. 5 is a characteristic diagram comparing a bimetal structure of adhering plate materials different in linear expansion coefficient to the optical wavelength element substrate shown in FIG. 3 and a case not using such plate materials.
Figure 6:
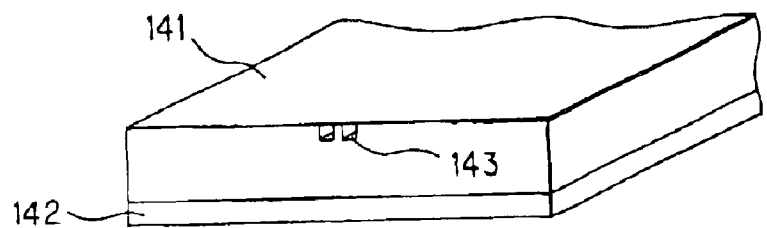
FIG. 6 is an essential perspective view of waveguide substrate and aluminum plate adhered thereto.
Figure 7:
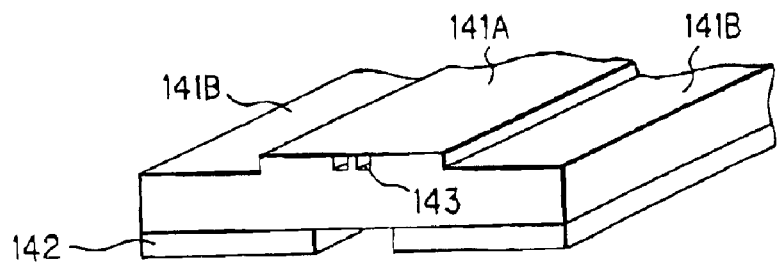
FIG. 7 is an essential perspective view showing a processed state for eliminating distortion of the waveguide substrate and aluminum plate shown in FIG. 6.
Figure 8:
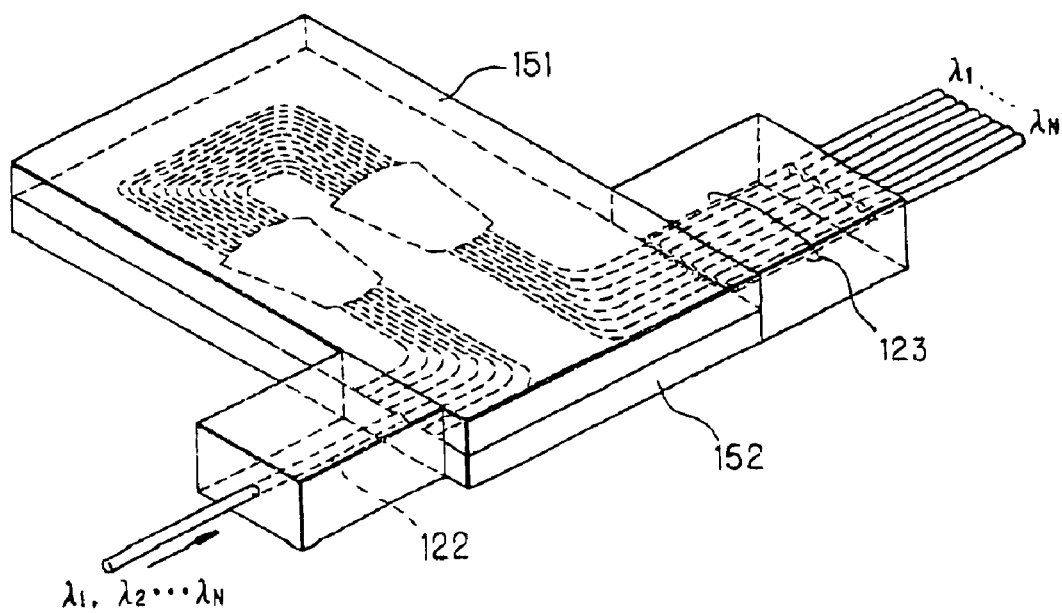
FIG. 8 is a perspective view showing essential parts of a optical waveguide device proposing adhesion of a substrate having a negative linear expansion coefficient to the optical waveguide element.
Figure 9:
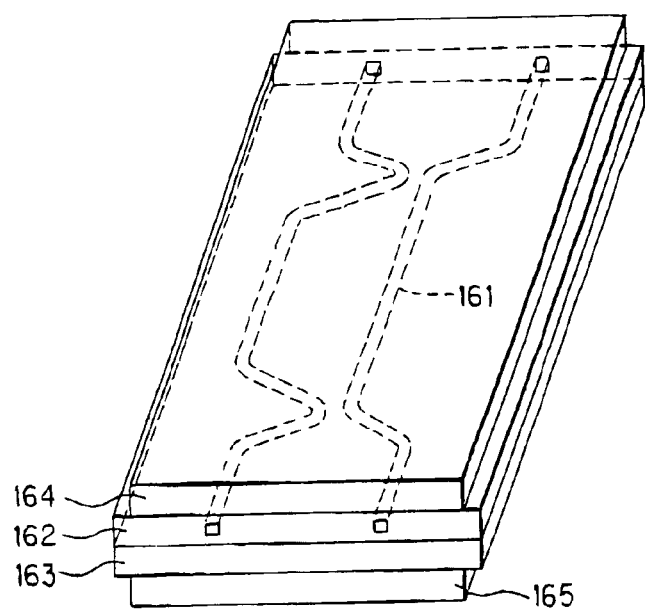
FIG. 9 is a perspective view showing other proposal of adhesion of a substrate having a negative linear expansion coefficient to the optical waveguide element.
Figure 10:
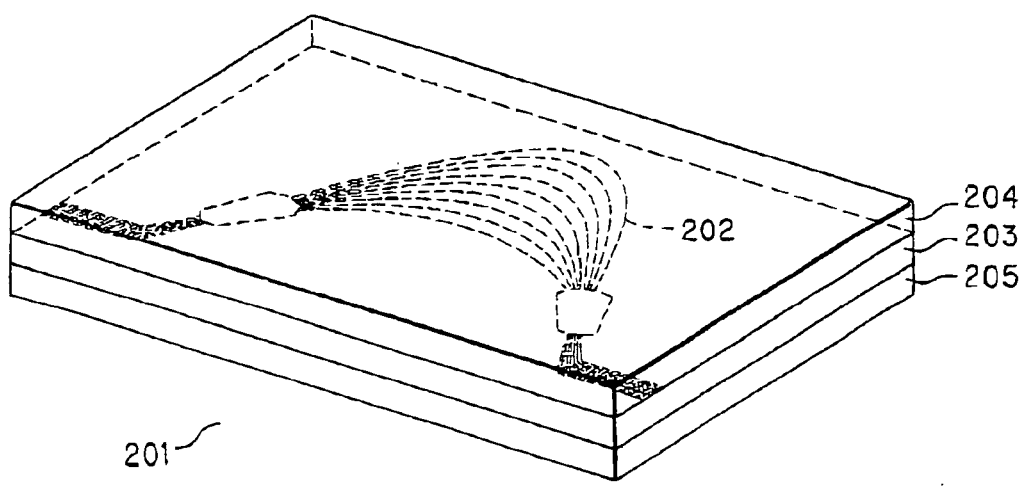
FIG. 10 is a perspective view of an arrayed waveguide grating as an example of an optical waveguide of the invention.

FIG. 10 shows an arrayed waveguide grating as a optical waveguide device according to the invention. This arrayed waveguide grating 201 comprises a waveguide element 203 forming an optical waveguide pattern 202, and first and second correction substrates 204, 205 disposed at both sides to enclose them.

Figure 11:
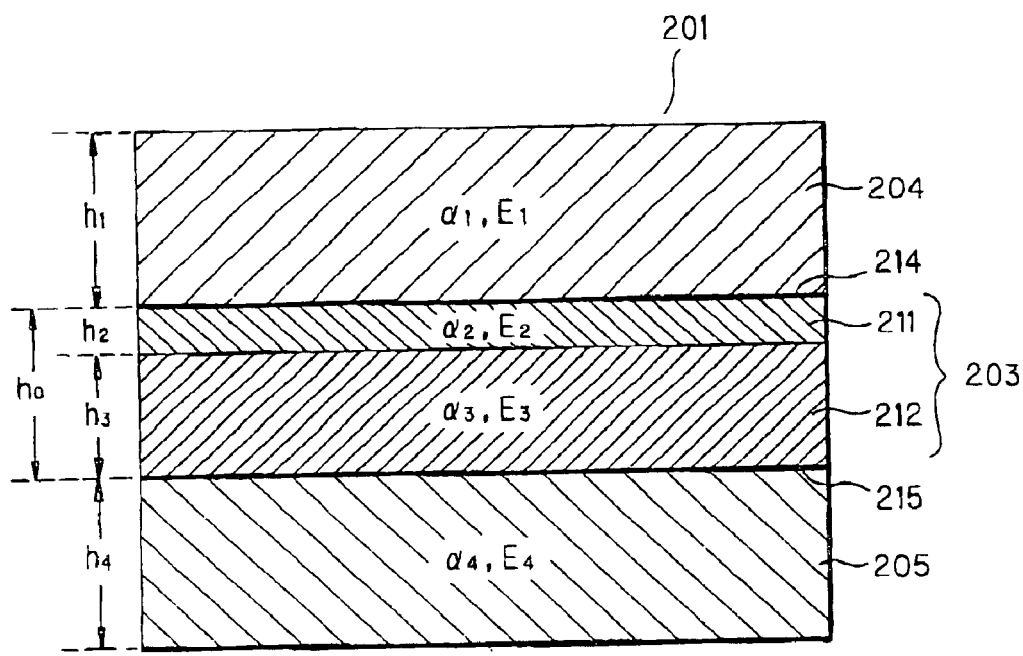
FIG. 11 is a sectional view showing an example of section of the arrayed waveguide grating of the invention.

FIG. 11 shows a sectional structure of the arrayed waveguide grating in this embodiment. More specifically, the arrayed waveguide grating 201 comprises the flat waveguide element 203 of specified thickness $h_0$ forming an optical waveguide layer 211 on a silicon substrate 212, the first correction substrate 204 of thickness $h_1$ adhered to the optical waveguide layer 211 side, and the second correction substrate 205 of thickness h4 adhered to the silicon substrate 212 side. The waveguide element 203 is composed of the optical waveguide layer 211 of thickness $h_2$ and the silicon substrate 212 of thickness $h_3$. The optical waveguide layer 211 and first correction substrate 204 are adhered with a first adhesive 214, and the silicon substrate 212 and second correction substrate 205 are adhered with a second adhesive 215.

The first and second adhesives 214, 215 are different from the adhesive hitherto used for adhering the silicon substrate 212 with other substrate, but adhesives of high rigidity are used. Conventionally, in consideration of prevention of difference in expansion or contraction due to temperature changes between substrates different in linear expansion coefficient from being transmitted to other substrates as far as possible, a flexible material of low rigidity was used as the adhesive, but in this embodiment, in order that the effects of expansion or contraction of one substrate may be transmitted to other substrate, the adhesive is selected from a completely opposite point of view.

The linear expansion coefficient and Young's modulus of each layer of the arrayed waveguide grating 201 are defined as follows. In the diagram, the linear expansion coefficient of the highest first correction substrate 204 is supposed to be $\alpha_1$ and its Young's modulus is $E_1$. The linear expansion coefficient of the optical waveguide layer 211 of the optical waveguide element is supposed to be $\alpha_2$ and its Young's modulus is $E_2$. The linear expansion coefficient of the waveguide substrate 212 of the optical waveguide element is supposed to be $\alpha_3$ and its Young's modulus is $E_3$. The linear expansion coefficient of the second correction substrate 205 is supposed to be $\alpha_4$ and its Young's modulus is $E_4$. Generally, the optical waveguide layer 211 of the optical waveguide element is extremely thin as compared with other parts such as the first correction substrate 204, silicon substrate 212 and second correction substrate 205. Namely, the thicknesses $h_1$, $h_2$, $h_3$, $h_4$ are in the following relation.

$$h_2 \ll h_1, h_3, h_4$$

Herein, the linear expansion coefficient $\alpha$ shows the degree of expansion or contraction of the substance itself by heat, and it is assumed that the both ends are open. The stress may be expressed as the product of Young's modulus multiplied by the distortion. The greater the Young's modulus, the stronger becomes the tensile stress due to expansion or contraction. Or, the greater the thickness $h_1$ to $h_4$ of the substrates, the stronger is the force of pulling or compressing the other substrate at the time of expansion or contraction.

Prior to analysis of the structure of optical waveguide element 203 shown in FIG. 11 enclosed by the first and second correction substrates 204, 205 from above and beneath, first, a structure of independent presence of the waveguide element 203, that is, the structure in the absence of the first and second correction substrates 204, 205 is explained. The waveguide element 203 is composed by forming the optical waveguide layer 211 on the silicon substrate 212 as mentioned above. Such substrate composed of two adhered layers is called a "two-layer adhered structure" in this specification.

Figure 12A:
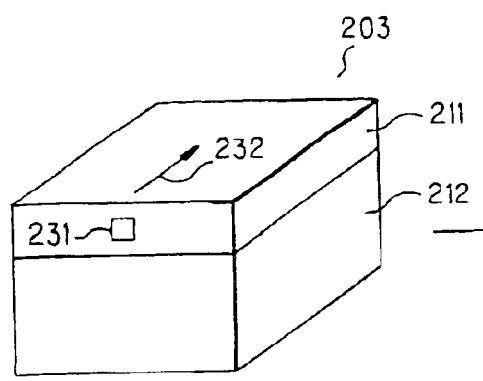
FIGS. 12a–b show a modified example of waveguide having effects on polarization dependence depending on temperature changes.
Figure 12B:
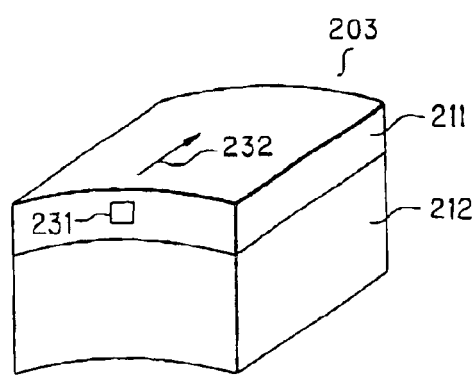

FIGS. 12a–b show before and after the change when the waveguide element is elongated in the waveguide direction due to temperature rise. FIG. 12(a) shows a state before elongation, and FIG. 12(b) shows an elongated state. In the diagram, reference numeral 231 shows the position of the waveguide, and it is disposed in the optical waveguide layer 211 in the direction of arrow 232. Since the optical waveguide layer 211 and silicon substrate 212 have different coefficients of linear expansion $\alpha_1$, $\alpha_2$, when the temperature changes, the entire waveguide element 203 is warped as shown in FIG. 12(b).

Figure 13A:
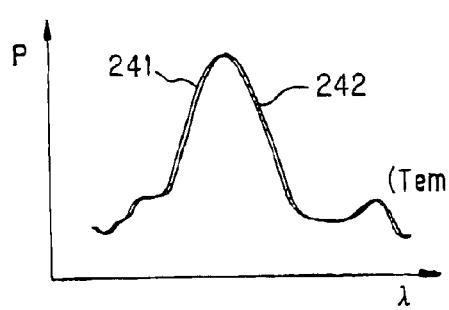
FIGS. 13a–b are diagrams showing temperature characteristics of polarization dependence occurring when warping as shown in FIGS. 12a–b.
Figure 13B:
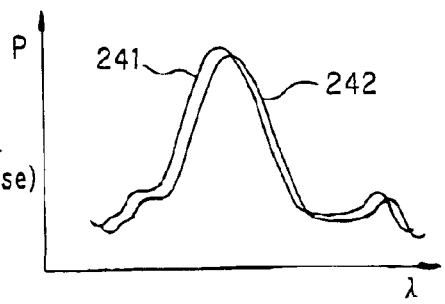

FIGS. 13a–b show the dislocation of wavelength due to TE polarization and TM polarization caused by such warping. In FIG. 13(a), a characteristic curve 241 of TE polarization and, a characteristic curve 242 of TM polarization coincide nearly with each other, but as a result of warping, these characteristic curves 241, 242 differ as shown in FIG. 13(b). Thus, in order to avoid or lessen such temperature dependence, it is necessary to prevent or decrease occurrence of warp due to temperature rise.

Incidentally, considering the vertical relation of the optical waveguide layer 211 formed on the silicon substrate 212 of the waveguide element 203, the "two-layer adhered structure" is realized in two modes, that is, concave warping and convex warping due to temperature rise. Of course, in the case of concave warping due to temperature rise, it is convex warping at the time of temperature fall, and in the case of convex warping due to temperature rise, itis concave warping at the time of temperature fall. Warping of the two-layer adhered structure is discussed in each case.

(1) Concave Warping of "Two-Layer Adhered Structure" Due to Temperature Rise

In this case, the linear expansion coefficient $\alpha_3$ is greater than the linear expansion coefficient $\alpha_2$ in FIG. 11. It is expressed in formula (3-1-1).

$$\alpha_2 < \alpha_3 \text{ (however, } \alpha_2 > 0 \text{)} \tag{3-1-1}$$

(2) Convex Warping of "Two-Layer Adhered Structure" Due to Temperature Rise

In this case, the linear expansion coefficient $\alpha_2$ is greater than the linear expansion coefficient $\alpha_3$ in FIG. 11. It is expressed in formula (3-2-1).

$$\alpha_2 > \alpha_3 \text{ (however, } \alpha_3 > 0 \text{)} \tag{3-2-1}$$

(3) No Warping of "Two-Layer Adhered Structure" Due to Temperature Rise

In this case, the linear expansion coefficient $\alpha_3$ and the linear expansion coefficient $\alpha_2$ are equal to each other in FIG. 11. It is expressed in formula (3-3-1).

$$\alpha_2 = \alpha_3 \tag{3-3-1}$$

Suppose the "two-layer adhered structure" is combined with the first correction substrate 204 and second correction substrate 205 above and beneath as shown in FIG. 11. Similarly, each case is discussed. Herein, the optical waveguide device is supposed to be athermal, that is, the temperature dependence is decreased.

(4) Concave Warping of "Two-Layer Adhered Structure" Due to Temperature Rise (Convex Warping Due to Temperature Fall)

In this case, the "two-layer adhered structure" is warped in a concave profile due to temperature rise in the condition of formula (3-4-1).

$$\alpha_2 < \alpha_3 \text{ (however, } \alpha_2 > 0 \text{)} \tag{3-4-1}$$

To decrease elongation and warp of the optical waveguide element 203, when the first correction substrate 204 and second correction substrate 205 are disposed as shown in FIG. 11, the first correction substrate 204 and second correction substrate 205 must have, if positive, a sufficiently small (close to zero) value of linear expansion coefficient (3-4-2), or a negative linear expansion coefficient (3-4-3) in order to enhance the effect. Accordingly, the elongation of the optical waveguide element 203 due to temperature rise can be decreased. Further, since the linear expansion coefficient $\alpha_4$ of the second correction substrate 205 is smaller than the linear expansion coefficient $\alpha_1$ of the first correction substrate 204 (in the negative sign, the absolute value is greater), the warp of the optical waveguide element 203 due to temperature rise can be decreased (3-4-4).

$$\alpha_1, \alpha_4 < \alpha_2 \tag{3-4-2}$$

$$\alpha_1, \alpha_4 < 0 \tag{3-4-3}$$

$$\alpha_1 > \alpha_4 \tag{3-4-4}$$

Next, considering other material characteristics of the correction substrate, as shown in the following formulas, the greater the Young's modulus, the higher is the rigidity and the smaller is the distortion in relation to the stress, and the greater the thickness h of the substrate, the smaller becomes the distortion. Accordingly, if formula (3-4-4) is not established, in addition to formula (3-4-2) or formula (3-4-3), when the following formula (3-4-5) or (3-4-6) is established, warping of the optical waveguide element 203 due to temperature rise can be decreased. When all formulas (3-4-3), (3-4-4), (3-4-5), and (3-4-6) are satisfied, the greatest effects are obtained, but by increasing the difference of each inequality sign, if the number of satisfied formulas is small, enough effect to decrease the warping is obtained.

$\epsilon = \sigma/E$ $\epsilon$: strain, $\sigma$: bending stress, E: Young's modulus $\sigma = M/Z$ M: bending moment, Z: modulus of section $Z = \frac{1}{6} bh^2$ b: sectional length of substrate, h: sectional thickness of substrate $$E_1 < E_4 \text{ (however, } E_2, E_3 < E_4 \text{)} \tag{3-4-5}$$

$$h_1 < h_4 \text{ (however, } h_2, h_3 < h_4 \text{)} \tag{3-4-6}$$

(5) Convex Warping of "Two-Layer Adhered Structure" Due to Temperature Rise (Concave Warping Due to Temperature Fall)

In this case, the "two-layer adhered structure" is warped in a convex profile due to temperature rise in the condition of formula (3-5-1).

$$\alpha_2 > \alpha_3 \text{ (however, } \alpha_3 > 0 \text{)} \tag{3-5-1}$$

To decrease elongation and warp of the optical waveguide element 203, when the first correction substrate 204 and second correction substrate 205 are disposed as shown in FIG. 11, the first correction substrate 204 and second correction substrate 205 must have, if positive, a sufficiently small (close to zero) value of linear expansion coefficient (3-5-2), or a negative linear expansion coefficient (3-5-3) in order to enhance the effect. Accordingly, the elongation of the optical waveguide element 203 due to temperature rise can be decreased. Further, since the linear expansion coefficient $\alpha_1$ of the first correction substrate 204 is smaller than the linear expansion coefficient $\alpha_4$ of the second correction substrate 205 (in the negative sign, the absolute value is greater), the warp of the optical waveguide element 203 due to temperature rise can be decreased (3-5-4).

$$\alpha_1, \alpha_4 < \alpha_2 \tag{3-5-2}$$

$$\alpha_1, \alpha_4 < 0 \quad (3\text{-}5\text{-}3)$$

$$\alpha_4 > \alpha_1 \quad (3\text{-}5\text{-}4)$$

Other material characteristics of the correction substrate can be considered in the same concept as in the case (4) above, and the explanation is omitted herein.

(6) No Warping of "Two-Layer Adhered Structure" Due to Temperature Changes

In this case, if the waveguide element 203 for composing the two-layer adhered structure is not warped, when the second correction substrate 205 shown in FIG. 11 is affixed to the waveguide substrate 212 side in order to support it, as far as its linear expansion coefficient $\alpha 4$ is not equal to the other coefficients of linear expansion $\alpha_2$, $\alpha_3$, the entire structure acts to cause convex or concave warping. To prevent this, it is necessary to affix the first correction substrate 204 of linear expansion coefficient $\alpha_1$ equal to the linear expansion coefficient $\alpha_4$ of the second correction substrate 205 to the optical waveguide layer 211 side.

In an example of the optical waveguide device of the invention, specific values are calculated below.

As the preliminary condition for calculation, the optical waveguide is supposed to be the arrayed waveguide grating 201 shown in FIG. 11. In this arrayed waveguide grating 201, the thickness $h_0$ of the optical waveguide element 203 is supposed to be $t_1$, and the linear expansion coefficient is $\alpha_0$. In the first and second correction substrates 204, 205, the thicknesses $h_1$, $h_4$ are supposed to be equal value $t_2$, and the coefficients of linear expansion are also supposed to be equal value $\alpha_1$. For the sake of simplicity, further, the Young's modulus of each layer is also assumed to be equal. In this case, the entire linear expansion coefficient $\alpha_{all}$ of the arrayed waveguide grating 201 is expressed in formula (4).

$$\alpha_{all} = \frac{t_1 \times \alpha_0 + 2 \times t_2 \times \alpha_1}{t_1 + 2 \times t_2} \quad (4)$$

First, the central wavelength $\lambda 0$ is set in formula (1), and it is put in formula (2) to be converted into the linear expansion coefficient $\alpha$, then from its value and formula (4), the coefficients of linear expansion $\alpha_0$, $\alpha_1$, and thicknesses $t_1$, $t_2$ of the substrates 203, 204 (205) are determined. For example, in the case of a quartz optical waveguide element formed on a Si substrate used as the arrayed waveguide grating 201, these values are calculated.

The thickness of the Si substrate as the optical waveguide element 203 is 0.8 mm, and its linear expansion coefficient $\alpha_0$ is $26.3 \times 10^{-7}/°$ C. In formula (2), $dn_{eq}/dT$ is $6.0 \times 10^{-6}$, and the equivalent refractive index $n_{eq}$ is 1.46. At the central wavelength $\alpha_0$ of 1.55 µm, suppose to make the temperature dependence zero. From formula (1) and formula (2), it is required to satisfy the following formula (5).

$$\frac{dn_{eq}}{dT} + n_{eq}\alpha_{all} \quad (5)$$

Therefore, from formula (4), the linear expansion coefficient $\alpha_{all}$ is determined as shown in formula (6).

$$\alpha_{all} = -41.0 \times 10^{-7} \quad (6)$$

Suppose the thickness of the first and second correction substrates 204, 205 adhered to the upper and lower side of the optical waveguide element 203 to be 1.5 mm. In this case, the linear expansion coefficient $\alpha_1$ of the first and second correction substrates 204, 205 is determined from formula (4) as shown in the following formula (7).

$$\alpha_1 = -59.0 \times 10^{-7} \quad (7)$$

It is hence known that the material having such linear expansion coefficient $\alpha_1$ should be used as the first and second correction substrates 204, 205.

Embodiments

As an embodiment, an optical waveguide, a optical waveguide device using the same, and a manufacturing method of optical waveguide device are explained below. First, as an example of optical waveguide, an arrayed waveguide grating having the configuration as shown in FIG. 10 was fabricated. As the preliminary condition, same as shown in FIG. 11, the thickness of the optical waveguide element 203 in the arrayed waveguide grating 201 is $h_0$, and the linear expansion coefficient is $\alpha_0$. Further, the thicknesses of the first and second correction substrates 204, 205 are $h_1$, $h_4$ are equal value t1, and their coefficients of linear expansion are equal value $\alpha_1$. As the first and second correction substrates 204, 205, using glass ceramic, an AWG (arrayed waveguide grating) variable in temperature dependence was manufactured. The coefficients of linear expansion $\alpha_1$ of the first and second correction substrates 204, 205 are both $-6.5 \times 10^{-7}/°$ C., and their thickness is 1 mm. The linear expansion coefficient $\alpha_0$ of the optical waveguide element 203 is $26.3 \times 10^{-7}/°$ C., and its thickness is 0.8 mm.

Using formula (4), the linear expansion coefficient $\alpha_{all}$ of the entire arrayed waveguide grating 201 is $2.87 \times 10^{-7}/°$ C. Putting it in formula (1) and formula (3), the central wavelength temperature characteristic can be determined.

Figure 14:
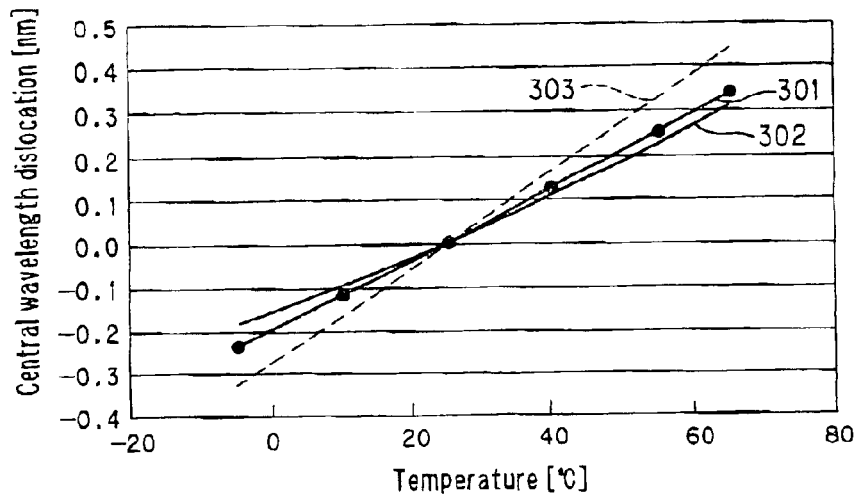
FIG. 14 is a characteristic diagram comparing the central wavelength temperature characteristic of the arrayed waveguide grating of the embodiment with an ordinary arrayed waveguide grating.

FIG. 14 compares the central wavelength temperature characteristic of the arrayed waveguide grating of the embodiment with an ordinary arrayed waveguide grating. In the actually manufactured array waveguide diffraction grating 201, measured results are shown by the characteristic curve 301 by plotting each measured value, and a thin line 302 shows the theoretical value. A broken line 303 shows the measured value of the ordinary arrayed waveguide grating used conventionally.

As known from the diagram, the arrayed waveguide grating 201 of the embodiment is lowered in the temperature dependence to about 75% (25% down) as compared with the conventional arrayed waveguide grating indicated by broken line 303. The measured results of the temperature characteristics are slightly different from the theoretical value, which is considered to be due to error of linear expansion coefficient $\alpha$, error in the thickness of the optical waveguide element 203 and first and second correction substrates 204, 205, and absorption of expansion and contraction of mutual substrates by the substrate adhesive layer.

Figure 15:
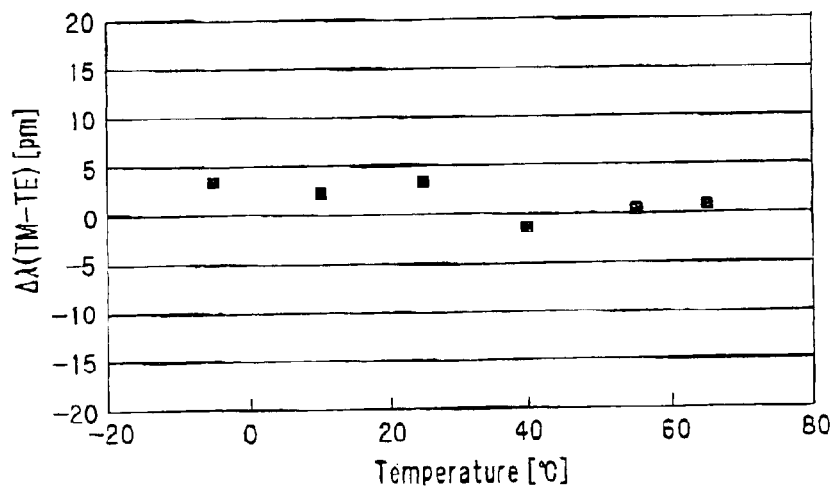
FIG. 15 is a characteristic diagram showing the difference of central wavelength between TM polarization and TE polarization due to temperature changes in the arrayed waveguide grating of the embodiment.
Figure 16:
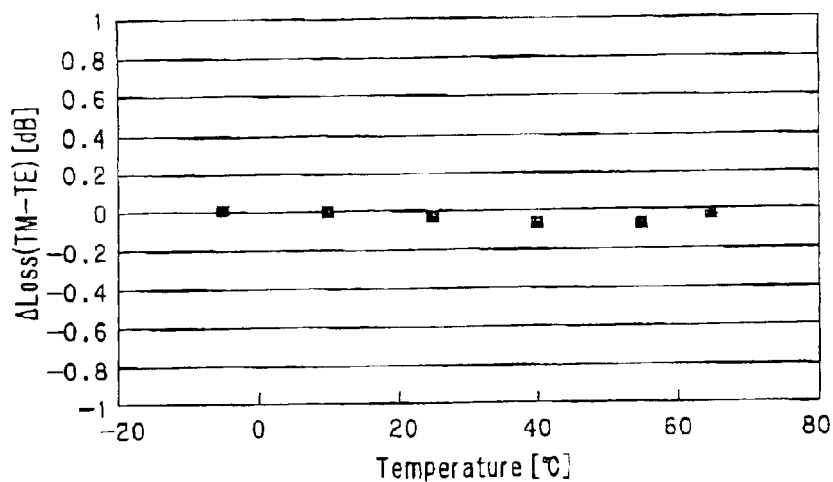
FIG. 16 is a characteristic diagram showing the difference of crest value of central wavelength between TM polarization and TE polarization due to temperature changes in the arrayed waveguide grating of the embodiment.

FIG. 15 and FIG. 16 show evaluation of the polarization dependent temperature characteristic. Specifically, in FIG. 15, the difference of central wavelength between TM polarization and TE polarization is denoted on the axis of ordinates, and temperature changes are plotted on the axis of abscissas. When the arrayed waveguide grating 201 of the embodiment is dependent on temperature, the difference of central wavelength between TM polarization and TE polarization is expanded or changed due to temperature rise or the like. However, as clear from FIG. 15, if the temperature changes, the difference of the central wavelength between TM polarization and TE polarization is only slightly increased or decreased within the error range from the center of "zero" level.

In FIG. 16, the difference of peak value of central wavelength between TM polarization and TE polarization is denoted on the axis of ordinates, and temperature changes are plotted on the axis of abscissas. Namely, as compared with FIG. 15 which shows the change in the deviation of TM polarization and TE polarization in the lateral direction (wavelength direction) due to temperature of two waveform crests, FIG. 16 shows the change in the deviation due to temperature in the longitudinal direction (crest value direction) of the waveform crests. In FIG. 16, too, the difference between TM polarization and TE polarization is only slightly increased or decreased within the error range from the center of "zero" level. Hence the arrayed waveguide grating 201 of the embodiment is proved to be capable of holding a stable characteristic free from temperature dependence, without requiring any particular temperature adjustment for change in the ambient temperature.

[First Modified Example of the Invention]

In the embodiment explained above, the correction substrates are disposed at both sides of the optical waveguide element 203, but, alternatively, a plurality of two or more correction substrates may be disposed at one side, and warping may be prevented by them, or the optical waveguide element 203 itself may be lessened in expansion or contraction due to temperature. It is also possible to dispose a plurality of correction substrates in a same number or in different numbers each at both sides of the optical waveguide element 203.

Figure 17:
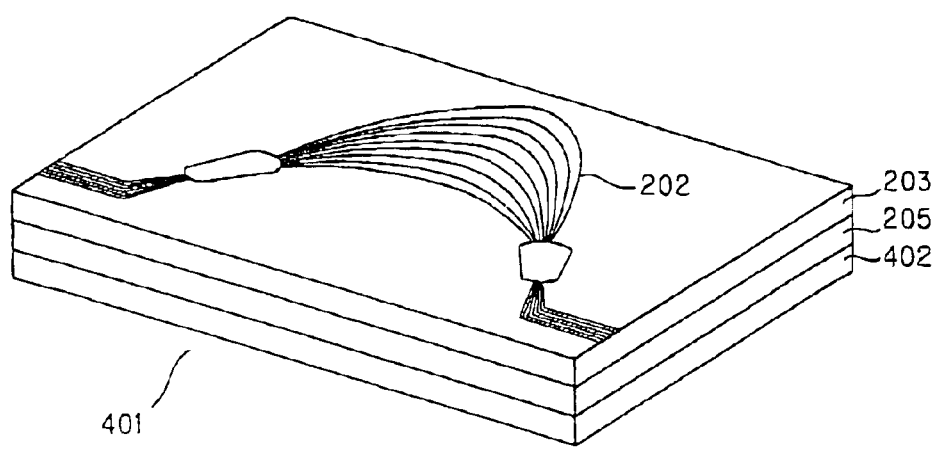
FIG. 17 is a perspective view of arrayed waveguide grating in a first modified example of the invention.

FIG. 17 shows an example of arrayed waveguide grating as a optical waveguide device in a first modified example of the invention. In the diagram, same parts as in FIG. 10 are identified with same reference numerals, and their explanation is properly omitted. An arrayed waveguide grating 401 of the modified example has a second correction substrate 205 adhered to the silicon substrate side of an optical waveguide element 203, and also has a first correction substrate 402 adhered further beneath it.

Figure 18:
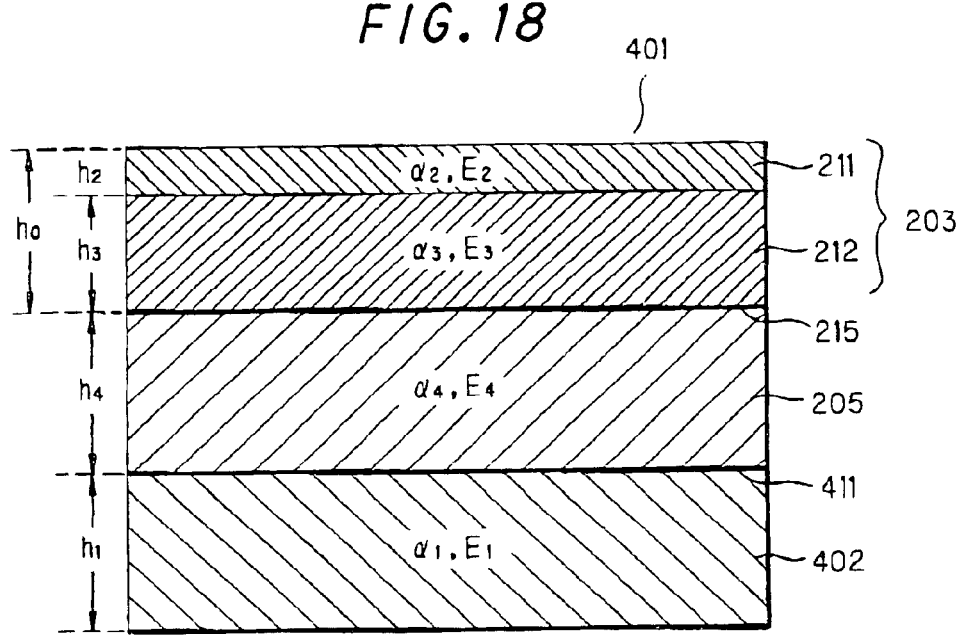
FIG. 18 is a sectional view of the arrayed waveguide grating in the first modified example.

FIG. 18 is a sectional view of the arrayed waveguide grating in this modified example. The arrayed waveguide grating 401 comprises a flat waveguide element 203 having a specified thickness $h_0$ forming an optical waveguide layer 211 on a silicon substrate 212, a second correction substrate 205 of thickness $h_4$ adhered to this silicon substrate 212 side, and a first correction substrate 402 of thickness $h_1$ adhered to other side (lower side in the diagram) of the second correction substrate 205. The waveguide element 203 is composed of the optical waveguide layer 211 of thickness $h_2$ and the silicon substrate 212 of thickness $h_3$. The silicon substrate 212 and second correction substrate 205 are adhered with a second adhesive 215, and the second correction substrate 205 and first correction substrate 402 are adhered with a first adhesive 411. The first and second adhesives 411, 215 are high in rigidity same as in the foregoing embodiment.

In the arrayed waveguide grating 401 of the modified example, the coefficients of linear expansion $\alpha_1$, $\alpha_4$, and Young's moduli $E_1$, $E_4$ are set so as to decrease the warp caused when only the waveguide element 203 and second correction substrate 205 are adhered, and expansion and contraction due to temperature changes of the waveguide element 203, sufficiently by the first correction substrate 402.

[Second Modified Example of the Invention]

Figure 19:
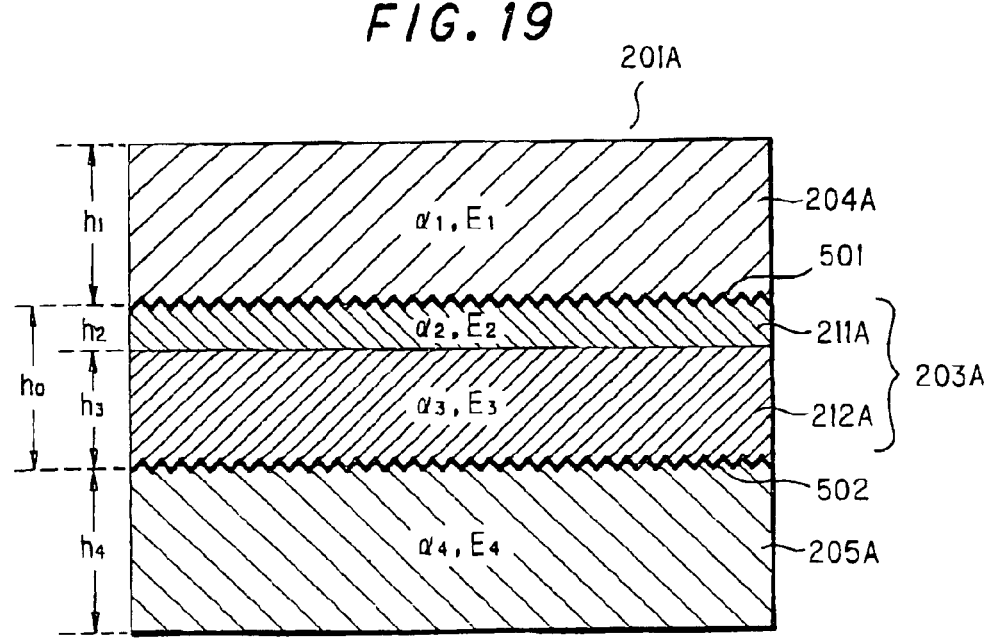
FIG. 19 is a sectional view showing an example of the section of an arrayed waveguide grating in a second modified example of the invention.

FIG. 19 shows a sectional structure of an arrayed waveguide grating in a second modified example of the invention. In the diagram, same parts as in FIG. 11 are identified with same reference numerals, and their explanation is properly omitted.

In an arrayed waveguide grating 201A of the modified example, mutual confronting surfaces of a first correction substrate 204A and optical waveguide layer 211A of waveguide element 203A are processed in a coarse surface having fine undulations. Similarly, mutual confronting surfaces of a silicon substrate 201A of the waveguide element 203A and a second correction substrate 205A are processed in a coarse surface having fine undulations. A first adhesive 501 for adhering the first correction substrate 204A and optical waveguide layer 211A, and a second adhesive 502 for adhering the silicon substrate 212A and second correction substrate 205A are not particularly high in rigidity after adhesion, but are ordinary adhesives as usually hitherto.

Namely, in the arrayed waveguide grating 201A of the second modified example, since expansion or contraction due to temperature of the first correction substrate 204A and second correction substrate 205A is transmitted to the waveguide element 203A side through the mutually coarse surfaces of the contact surfaces, warping can be prevented effectively without requiring the first and second adhesives 501, 502 of particularly high rigidity. Of course, the coarse surface may be only one of the confronting surfaces. Such processing may be done on one of the confronting surfaces of the first correction substrate 204 and second correction substrate 205, and other confronting surface may be processed with a special adhesive as explained in the foregoing embodiment.

Moreover, the pattern of coarse surface may be properly designed. Herein, the layout pattern of coarse surface is not intended to limit the region of the coarse surfaces to a part of the confronting surfaces, but includes selective use of plural coarse patterns for disposing which coarse surface in each region, or an analog pattern layout showing the region of continuous variation of the degree of coarse surface.

In the foregoing embodiment and modified examples, the arrayed waveguide gratings 201, 401 are explained, but the invention may be applied to other waveguide elements such as Mach-Zehnder interferometer.

As described herein, in order to eliminate the temperature dependence of optical characteristics of the conventional optical waveguide element, and suppress the thermal deformation of the waveguide element in the longitudinal direction, the linear expansion coefficient is different from the case of adhering a correction plate smaller than the waveguide element, correction substrates are disposed at both sides of the waveguide element, and these material characteristics (linear expansion coefficient, Young's modulus, thickness, etc.) are taken into consideration, and the thermal deformation in the warping direction can be suppressed. Hence it can solve the conventional problems of deterioration of other optical characteristics of waveguide element due to thermal deformation in the warping direction.

According to the invention, plural flat correction substrates are affixed to both sides or one side of the flat waveguide element, and all of them including the waveguide element are set to such values that their length and warping force due to temperature changes may be decreased as compared with the case of the waveguide element alone. For example, when one correction substrate is affixed to one side of the waveguide element, warping may occur on the whole due to difference in the linear expansion coefficient of the waveguide element, but this warping can be decreased by affixing further one or a plurality of correction substrates to this correction substrate and setting the coefficients of linear expansion of these correction substrates at proper values. Moreover, by correcting the direction of suppressing the expansion or contraction due to temperature of the waveguide element by these correction substrates, fluctuations of characteristics of the waveguide element can be suppressed if temperature changes occur, so that temperature adjustment of waveguide element may not be required. Hence, the cost is lowered and the electric power is saved.

According to another aspect of the invention, first and second correction substrates are affixed so as to enclose at both sides of the flat waveguide element, and the coefficients of linear expansion of the first and second correction substrates are set to such values that the length and warping force of the waveguide element due to temperature changes may be decreased as compared with the case of the waveguide element alone. Therefore, warping of waveguide element at various temperatures can be decreased, and fluctuation of characteristics of the waveguide element can be suppressed. Besides, temperature adjustment of waveguide element is not required, and hence the device cost is lowered and the electric power is saved.

According to a further aspect of the invention, first and second correction substrates are affixed so as to enclose at both sides of the flat waveguide element, and the coefficients of linear expansion of the first and second correction substrates, or Young's moduli, or thicknesses, or plural items thereof set at such values as to decrease the length and warping force of the waveguide element due to temperature changes as compared with the case of the waveguide element alone. Warping of the waveguide element can be decreased effectively. Moreover, by correcting in the direction of suppressing the expansion or contraction due to temperature of the waveguide element by the first and second correction substrates, fluctuations of characteristics of the waveguide element can be suppressed if temperature changes occur, so that temperature adjustment of waveguide element may not be required.

According to yet a further aspect of the invention, first and second correction substrates are affixed so as to enclose at both sides of the flat waveguide element. Herein, the second correction substrate is disposed at the substrate side of the waveguide element, and is thicker than the first correction substrate, and has a linear expansion coefficient smaller than the linear expansion coefficient of the waveguide element, and a linear expansion coefficient smaller than the linear expansion coefficient of the first correction substrate. Since the first and second correction substrates have a thickness greater than the thickness of the waveguide element and a linear expansion coefficient smaller than the linear expansion coefficient of the waveguide element, expansion or contraction of the waveguide element due to temperature changes can be suppressed. Moreover, since these correction substrates are enclosing the both sides of the waveguide element, by properly setting their coefficients of linear expansion or thickness, generation of warp of waveguide element can be suppressed to a minimum limit. Still more, since the first and second correction substrates differ in the linear expansion coefficient and the first correction substrate has a greater negative value, the first correction substrate disposed at the waveguide layer side of the waveguide element can be formed relatively in a smaller thickness. In addition, by the first and second correction substrates, expansion and contraction of the waveguide element due to temperature can be corrected in a suppressing direction, and fluctuations of characteristics of the waveguide element can be suppressed if temperature changes occur, so that temperature adjustment of waveguide element may not be required.

According to a still further aspect of the invention, first and second correction substrates are affixed so as to enclose at both sides of the flat waveguide element. Herein, the first correction substrate is disposed at the substrate side of the waveguide element, and is thicker than the waveguide element, and has a negative linear expansion coefficient. The second correction substrate is disposed at the substrate side of the waveguide element, and is thicker than the first correction substrate, and has a negative linear expansion coefficient, and more specifically has a linear expansion coefficient of a greater absolute value than the linear expansion coefficient of the first correction substrate. Since the first and second correction substrates have a thickness greater than the thickness of the waveguide element and a negative linear expansion coefficient, expansion or contraction of the waveguide element due to temperature changes can be suppressed. Moreover, since these correction substrates are enclosing the both sides of the waveguide element, by properly setting their coefficients of linear expansion or thickness, generation of warp of waveguide element can be suppressed to a minimum limit. Still more, since the second correction substrate has a linear expansion coefficient of a larger absolute value than the linear expansion coefficient of the first correction substrate, the first correction substrate disposed at the waveguide layer side of the waveguide element can be formed relatively in a smaller thickness. In addition, by the first and second correction substrates, expansion and contraction of the waveguide element due to temperature can be corrected in a suppressing direction, and fluctuations of characteristics of the waveguide element can be suppressed if temperature changes occur, so that temperature adjustment of waveguide element may not be required.

According to another aspect of the invention, one of the first and second correction substrates can be shared by the holding plate of the waveguide element. Hence, the entire size of the optical waveguide device is suppressed, which contributes to reduction of cost.

According to still another aspect of the invention, the first and second correction substrates are mutually equal in the linear expansion coefficient and Young's modulus, and mutually equal in thickness. Therefore, parts can be commonly used, and the cost of the parts can be curtailed.

According to yet another aspect of the invention, the waveguide element and correction substrate are affixed with an adhesive of high rigidity, expansion or contraction of correction substrate due to temperature can be efficiently transmitted to the waveguide element, and absorption of stress due to deformation of adhesive layer can be curtailed.

According to still another aspect of the invention, the optical waveguide device has a clamp glass, and the adhesion strength of the fiber array can be reinforced.

According to a further aspect of the invention, the first correction substrate is as thin as the clamp glass or less, and the thickness of the entire device is not particularly increased.

According to a still further aspect of the invention, since at least a part of the confronting sides of the waveguide element and correction substrate is a coarse surface, expansion or contraction of correction substrate due to temperature can be efficiently transmitted to the waveguide element, and the degree of expansion or contraction of waveguide element can be decreased. Moreover, the range of selection of adhesive is expanded.

According to an additional aspect of the invention, imbalance of expansion and contraction by temperature with respect to the two-dimensional configuration of the optical waveguide device is eliminated or decreased by controlling the layout pattern of the coarse surface. Herein, if the optical waveguide device has a complicated shape two-dimensionally, its expansion or contraction can be corrected at high precision.

According to another aspect of the invention, since the first or second correction substrate having a negative thermal expansion coefficient is affixed to the upper side and lower side of the flat waveguide element, expansion or contraction of the waveguide element due to temperature changes can be suppressed. Moreover, since these correction substrates enclose the both sides of the flat waveguide element, by setting their coefficients of linear expansion or thickness properly, warp of the waveguide element can be kept to minimum.

According to yet another aspect of the invention, the first and second correction substrates are different in the linear expansion coefficient, and the absolute value of the linear expansion coefficient of the first correction substrate is smaller than that of the linear expansion coefficient of the second correction substrate, so that the first correction substrate disposed at the waveguide layer side of the waveguide element may be relatively thin.

According to a further aspect of the invention, being affixed with an adhesive of high rigidity, expansion or contraction of correction substrate due to temperature can be efficiently transmitted to the waveguide element, and the degree of expansion or contraction of waveguide element can be decreased.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed:

1. A optical waveguide device comprising:
   a flat waveguide element having a specified thickness with a waveguide layer formed on a substrate,
   a first correction substrate disposed at the waveguide layer side of this waveguide element, having a thickness greater than the thickness of the waveguide element and a linear expansion coefficient smaller than the linear expansion coefficient of the waveguide element, and
   a second correction substrate disposed at the substrate side of the waveguide element, thicker than the first correction substrate, and having a linear expansion coefficient smaller than the linear expansion coefficient of the waveguide element, and a linear expansion coefficient smaller than the linear expansion coefficient of the first correction substrate.

2. The optical waveguide device of claim 1, wherein one of the first and second correction substrates is a plate for holding the waveguide element.

3. A optical waveguide device comprising:
   a flat waveguide element having a specified thickness with a waveguide layer formed on a substrate,
   a first correction substrate disposed at the waveguide layer side of this waveguide element, having a thickness greater than the thickness of the waveguide element and a negative linear expansion coefficient, and
   a second correction substrate disposed at the substrate side of the waveguide element, thicker than the first correction substrate, and having a negative linear expansion coefficient, and a linear expansion coefficient of greater absolute value than the linear expansion coefficient of the first correction substrate.

4. The optical waveguide device of claim 3, wherein one of the first and second correction substrates is a plate for holding the waveguide element.

* * * * *